Oct. 28, 1941.  J. D. HANAWALT ET AL  2,260,746
METHOD OF TREATING CARBON OR GRAPHITE
Filed Sept. 2, 1938
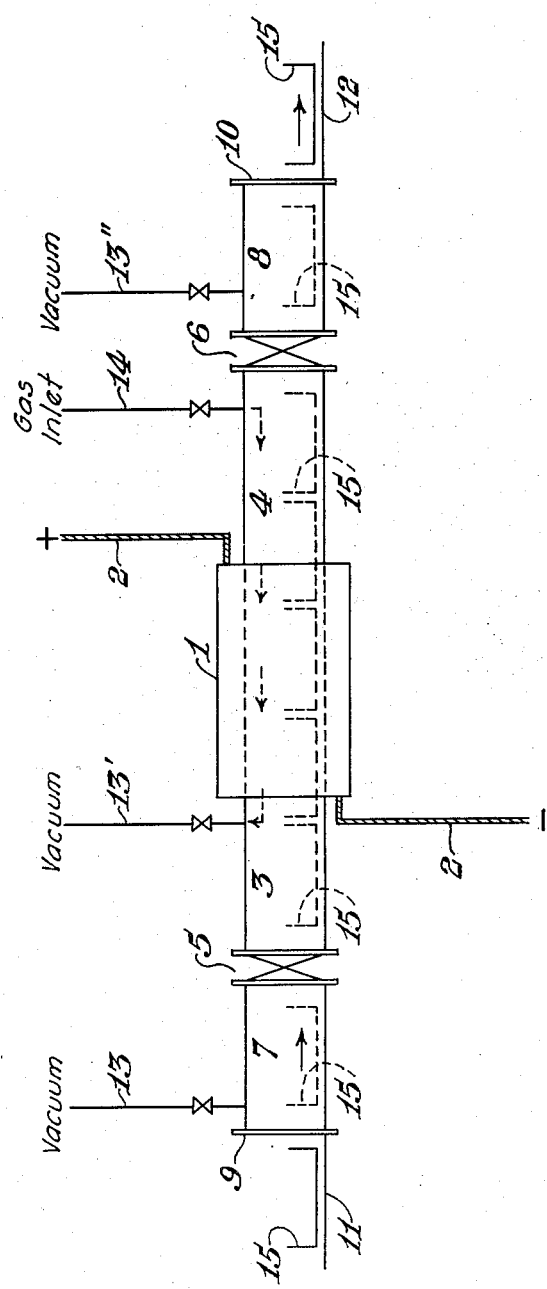
INVENTORS
Joseph D. Hanawalt
Charles E. Nelson
BY Griswold & Burdick
ATTORNEYS.

Patented Oct. 28, 1941

2,260,746

UNITED STATES PATENT OFFICE 2,260,746

METHOD OF TREATING CARBON OR GRAPHITE

Joseph D. Hanawalt and Charles E. Nelson, Midland, Mich., assignors to The Dow Chemical Company, Midland, Mich., a corporation of Michigan Application September 2, 1938, Serial No. 228,094

8 Claims. (Cl. 23—209.9)

The invention relates to a method of treating carbon or graphite and more particularly concerns a method of obtaining graphite or carbon articles, such as electrodes, in a highly purified form.

In one of the uses for carbon or graphite, namely, as electrodes useful in the operation of making spectrum analyses for various elements in the manner described by R. Mannkopff and C. Peters in Zeits. f, Physik, 70, 444, (1931), it is necessary that the carbon or graphite be highly pure, for otherwise, the impurities present give spectrum bands which may mask the bands emitted by the elements whose presence it is desired to detect.

It has recently been proposed to purify carbon or graphite electrodes so as to render them suitable for use in spectrum analyses by subjecting them to a relatively high temperature heat treatment in a suitable furnace held under reduced pressure, whereby the impurities are caused to vaporize away from the carbon. However, while the proposed method can be successfully used in purifying small batches of electrodes, wherein only a relatively small furnace need be used, we have found that it is not feasible to obtain electrodes of satisfactory purity when the process is carried out on a commercial scale, where either large batches of electrodes must be purified or the process adapted to continuous operation. The relatively poor results as regards the purity of the electrodes obtained when the proposed method is employed in carrying out a batch purification operation on a commercial scale is due to the fact that, while in a small furnace which can be uniformly heated the impurities do not have the opportunity to condense before they are completely removed, in a large furnace necessarily required to carry out the purification on a commercial scale it is difficult to obtain even heating throughout the furnace, with the result that the vaporized impurities may, and often do, condense not only in the cooler portions of the furnace but upon portions of the electrodes which are insufficiently heated. The condensation of the vaporized impurities upon the electrodes is even more pronounced when an attempt is made to adapt the proposed method of purification to continuous operation, because the charge of electrodes must be passed through the heated section of the furnace and into a cooled portion before it can be removed from the furnace. As the charge is moved into the cooled portion, the impurities condense on and contaminate the charge.

It is, therefore, an object of the invention to provide a method whereby carbon or graphite electrodes can be rendered highly pure so as to be suitable for use in spectrum analyses when relatively large quantities are treated in a single operation.

Another object is to provide a method of purifying carbon or graphite electrodes which is adapted to continuous operation. Other objects and advantages will be apparent from the following detailed description of the invention.

According to the method of the invention, carbon or graphite articles in the form of bars, rods, or the like, are heated to a relatively high temperature in a suitable furnace under sub-atmospheric pressure, while a relatively small volume of an inert or a reducing gas is continuously directed through the furnace. The continuous flow of an inert or a reducing gas through the furnace is necessary in carrying out the method of the invention, since it acts to remove or sweep the vaporized impurities from the furnace, preventing them from condensing out in the furnace and on the purified charge as the furnace is allowed to cool or as the charge is moved into a cooled zone. By this method we have found that ordinary graphite or carbon can be rendered highly pure so as to produce only a negligible amount of ash on being consumed in oxygen or air, and thus, when used as electrodes for spectrum analyses, such purified material produces practically no interfering spectra.

The carbon or graphite articles to be purified are heated to a temperature of between about 2100° to 2600° C. or higher, and preferably to about 2400° C. The charge should be held within the above temperature range for from 5 to 60 minutes up to several hours, depending upon the size of the charge being purified. For example, 1 rod ¼ inch in diameter and one foot long can be purified in 5 minutes, while a charge of 30 rods of the same size may require as long as 16 hours. While the charge is held within the above temperature range, a stream of an inert or a reducing gas, such as helium, argon, hydrogen, nitrogen, or the like, is slowly and continuously passed through the furnace and over the charge. The gases listed above have the property of being non-oxidizing and thus do not affect or oxidize the graphite or carbon articles. The stream of gas passing through the furnace and over the charge acts to sweep the impurities volatilizing out of the carbon from the furnace. The impurities flow with the inert gas from the furnace and are drawn into the vacuum line where they are condensed. The gas may be directed into the furnace at either end when the process is carried out as a batch operation, it being desirable, however, to introduce the gas into the furnace at the end opposite to that where the reduced pressure or vacuum outlet is located, in order to insure the gas flowing through the furnace over the charge. If the process is carried out as a continuous operation, the flow of gas is directed through the furnace counter-flow to the direction the charge is moving through the furnace. The counter-flow of gas not only serves to prevent vaporized impurities from condensing out on the purified charge as it is moved through the furnace into a cooled zone, but also serves to cool the charge moving out of the hot zone of the furnace and to preheat the incoming charge that is to be purified.

The volume of gas required to carry the vaporized impurities away from the carbon and out of the furnace is relatively small, e. g. from 0.35 to 8.0 liters per square centimeter of free cross sectional area in the furnace per hour has been found to be sufficient. The free cross sectional area referred to above is figured as the area of the smallest unrestricted cross section of the furnace allowing the flow of gas therethrough.

The pressure in the furnace should be held well below atmospheric pressure during operation. With a small flow of gas, such as that above mentioned, however, reduced pressure may be readily maintained. A pressure of below 10 inches of mercury is satisfactory, although a pressure below about 2 inches is preferable.

Various types of apparatus may be suitably employed in carrying out the method of the invention. For example, if the process is carried out as a batch process, any conventional type of furnace capable of being heated to the relatively high temperatures required, such as a graphite resistor furnace, may be employed. However, it is preferable to adapt the process to more nearly continuous operation in order to save time, since in carrying out the invention by the batch method, an excessive waste of time occurs as the furnace is allowed to cool down to a temperature such that the charge can be removed.

The accompanying drawing shows diagrammatically an apparatus for carrying out the method of the invention as a continuous operation.

In said drawing, an electric furnace 1, of the resistor or other suitable type, provided with electrical connections 2, communicates at either end with horizontal chambers 3 and 4, respectively. Chambers 3 and 4 in turn communicate through air locks or valves 5 and 6 with outer chambers 7 and 8, respectively. The outer ends of chambers 7 and 8 are closed by gas-tight doors 9 and 10, and are also provided with platform extensions 11 and 12 leading to the interior of the chamber when its door is opened. Chambers 3, 7 and 8 are provided with valved connections 13, 13' and 13" to a source of reduced pressure or vacuum, while in chamber 4 a gas inlet connection 14 is provided. A plurality of trays or cars 15 is shown, adapted for carrying a charge of material through the apparatus.

In the operation of the apparatus, a tray 15 on platform 11 is loaded with a charge of graphite to be purified, door 9 is opened and the tray is pushed into chamber 7, which is then closed up and a vacuum applied through connection 13. In the meantime, furnace 1 and communicating chambers 3 and 4 are likewise evacuated to the desired degree, air locks 5 and 6 being tightly closed. When chamber 7 has been evacuated to about the same degree, air lock 5 is opened, and the tray in chamber 7 is pushed into chamber 3, after which lock 5 is closed. A second loaded tray can then be admitted into chamber 7, which is again evacuated, and the tray then forwarded into chamber 3 as described. As the second tray is pushed into chamber 3, it in turn pushes the first tray further ahead in the chamber. In the same manner additional loaded trays are admitted successively into chambers 7 and 3, each tray pushing those in front farther ahead, until the available space in chamber 3, furnace 1 and chamber 4 is occupied. As the loaded trays move forward, their contents are preheated in chamber 3, then heated in furnace 1 to a sufficient temperature to drive off volatile materials, and finally cooled somewhat in chamber 4. During the heating, the vacuum is maintained in the inter-communicating furnace and chambers 3 and 4 by means of vacuum connection 13' in chamber 3. Coincidentally a small stream of inert gas is admitted at inlet 14 in chamber 4, such gas stream being drawn through the furnace in counter-current direction to the movement of the loaded trays. The stream of gas constantly flowing under reduced pressure through the furnace acts to carry away vapors evolved from the heated graphite and prevents such vapors from entering the cooled zone into which the purified charge is being moved. When chamber 4 has been filled with trays, chamber 8 is evacuated, air lock 6 is opened, and the leading tray is pushed from chamber 4 to chamber 8, after which lock 6 is closed. In chamber 8 the charge in the tray is further cooled, and the tray can then be removed by opening door 10 and drawing the tray out onto platform 12. By repeating the operations as described a continuous line of loaded trays can be forwarded through the apparatus at whatever rate is found suitable for securing the degree of purification desired in the product.

In the foregoing manner carbon or graphite electrodes can be rendered so highly pure on a commercial scale that when they are analyzed for impurities by chemical methods it is difficult to detect even traces of impurities and when the purified electrodes are used in spectrum analyses the impurities, if present, are there in amounts so small as not to be revealed in the spectrum. In addition the new and improved method herein described has the advantage that it may readily be adapted to large scale commercial operation either as a batch process or as a continuous one.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of purifying a carbon or graphite article, the step which consists in heating the article to a temperature above about 2100° C. at a pressure below about 10 inches of mercury, while passing a relatively small volume of an inert gas over the article.

2. In a method of purifying a carbon or graphite article, the step which consists in heating the article to a temperature above about 2400° C. at a pressure below about 2 inches of mercury, while passing a relatively small volume of an inert gas over the heated article.

3. In a method of purifying a carbon or graphite article, the step which consists in passing the article through a furnace heated to between about 2100° to 2600° C. and maintained under a pressure below 10 inches of mercury, while passing a relatively small volume of an inert gas through the furnace in a direction countercurrent to the direction of movement of the article.

4. In a method of purifying a carbon or graphite article, the steps which consist in passing the article through a furnace heated to a temperature above about 2100° C. and maintained under a pressure below 10 inches of mercury at a rate such that the article remains in the hot zone for from 5 to 60 minutes, and passing a relatively small volume of a reducing gas through the furnace in a direction counter-flow to the direction the article is being passed through the furnace.

5. In a method of purifying a carbon or graphite article, the step which consists in passing the article through a furnace heated to a temperature above about 2100° C. and maintained at a pressure below 10 inches of mercury, while passing an inert gas through the furnace in an amount of from 0.35 to 8.0 liters per hour per square centimeter of free cross sectional area in the furnace.

6. In a method of purifying a carbon or graphite article, the step which consists in passing the article through a furnace heated to between about 2100° and 2600° C. and maintained at a pressure below 2 inches of mercury, while passing nitrogen through the furnace in an amount of from 0.35 to 8.0 liters per hour per square centimeter of free cross sectional area in the furnace.

7. In a method of purifying a carbon or graphite article, the step which consists in heating the article to the temperature above about 2100° C. at a pressure below about 10 inches mercury while passing a relatively small volume of non-oxidizing gas over the article.

8. In a method of purifying a carbon or graphite article, the step which consists in heating the article to a temperature above about 2100° C. at a pressure below about 10 inches mercury while passing a relatively small volume of a reducing gas over the article.

JOSEPH D. HANAWALT.
CHARLES E. NELSON.